United States Patent
Smith et al.

(10) Patent No.: US 6,489,724 B1
(45) Date of Patent: Dec. 3, 2002

(54) DIMMER SWITCH WITH ELECTRONIC CONTROL

(75) Inventors: Joseph Russell Smith, Unionville, CT (US); Gurdev Singh Bains, Wolcott, CT (US); Paul Michael Jarry, Southington, CT (US)

(73) Assignee: Carling Technologies, Inc., Plainville, CT (US)

( * ) Notice: Subject to any disclaimer, the term of this patent is extended or adjusted under 35 U.S.C. 154(b) by 121 days.

(21) Appl. No.: 09/722,999

(22) Filed: Nov. 27, 2000

(51) Int. Cl.$^7$ ................................................. B60Q 1/02
(52) U.S. Cl. ................... 315/83; 315/307; 315/DIG. 4; 338/202; 338/172; 338/199
(58) Field of Search .............................. 315/77, 82, 83, 315/307, 291, DIG. 4; 307/10.8; 338/162, 172, 191, 200, 184, 199, 202

(56) References Cited

U.S. PATENT DOCUMENTS

| | | | | |
|---|---|---|---|---|
| 4,654,626 A | * | 3/1987 | Carsello | 338/172 |
| 5,329,204 A | * | 7/1994 | Ricca | 307/10.8 |
| 5,621,277 A | * | 4/1997 | Ricca | 307/10.8 |
| 6,259,351 B1 | * | 7/2001 | Radosavljevic et al. | 338/153 |

* cited by examiner

*Primary Examiner*—Haissa Philogene
(74) *Attorney, Agent, or Firm*—McCormick Paulding & Huber LLP

(57) ABSTRACT

A dimmer switch assembly includes a housing for supporting and enclosing the assembly components. A dimmer adjusting element is mounted on the housing and has a movable portion for movement in first and second directions. An elongated flexible triggering member has a first longitudinal end coupled to the movable portion of the dimmer adjusting element and a second longitudinal end provided in a socket defined by the housing. First and second detectors are spaced from and arranged opposite to one another. The elongated member is interposed between the detectors such that movement of the dimmer adjusting element in the first direction flexes the elongated member toward to activate the first detector, and movement of the dimmer adjusting element in the second direction flexes the elongated member toward to activate the second detector. The detectors have signals associated respectively therewith which are generated by the detectors when the detectors are activated by the triggering device. A dimmer control circuit has as inputs the signals from the first and the second detectors for adjusting a dimmer intensity output signal to decrease the intensity of a light source when the first detector is activated, and to increase the intensity of the light source when the second detector is activated.

16 Claims, 6 Drawing Sheets

DIMMER SWITCH WITH ELECTRONIC CONTROL

FIELD OF THE INVENTION

This invention relates generally to an electrical switch, and more particularly to a dimmer switch with a control circuit for automatically increasing or decreasing light intensity by either full scale or incremental amounts.

BACKGROUND OF THE INVENTION

Dimmer switches are well known devices for saving electrical power to or varying the light intensity of an illuminating device usually between a fully on state and a fully off state. Such dimmer switches typically include a variable resistance which the user adjusts for varying the electrical power to the light source to alter the light source intensity. Dimmer switches typically include mechanical components which provide only coarse adjustments to the illuminating device and other loads. When the dimmer switch regulates electrical power to an illuminating device in a vehicle dashboard, for example, the addition of other accessories in the vehicle can typically increase the load of the dimmer switch circuit to a level that can lead to damage to the dimmer switch and surrounding components. Even inadvertent jostling of the dimmer switch can result in the light intensity of the load undesirably jumping to either a fully on state or a fully off state. An object of the present invention is to provide a dimmer switch control assembly that overcomes the drawbacks and disadvantages associated with prior dimmer switches.

SUMMARY OF THE INVENTION

In one aspect of the present invention a dimmer switch assembly includes a housing for supporting and enclosing the assembly components. A dimmer adjusting element is mounted on the housing and has a movable portion for movement in first and second directions. A triggering device is coupled to the movable portion of the dimmer adjusting element. First and second detectors, preferably microswitches, are spaced from one another. The triggering device is interposed between the detectors such that movement of the triggering device upon movement of the movable portion of the dimmer adjusting element in the first direction activates the first detector, and movement of the triggering device upon movement of the movable portion of the dimmer adjusting element in the second direction activates the second detector. The detectors generate input signals to a dimmer control circuit such that the dimmer control circuit provides a dimmer intensity output signal to decrease the intensity of a light source when the first detector is activated, and to increase the intensity of the light source when the second detector is activated.

In a first alternative embodiment the dimmer switch assembly includes a dimmer adjusting element mounted on the housing and a movable portion thereof for movement in first and second directions. An elongated flexible triggering member has a first longitudinal end coupled to the movable portion of the dimmer adjusting element and a second longitudinal end provided in a socket fixed in the housing. First and second detectors are spaced from and arranged opposite to one another. The elongated member is interposed between the detectors such that movement of the dimmer adjusting element in the first direction flexes the elongated member toward to activate the first detector, and movement of the dimmer adjusting element in the second direction flexes the elongated member toward to activate the second detector. The detectors have signals associated respectively therewith which are generated by the detectors when the detectors are activated by the triggering device. A dimmer control circuit has as inputs the signals from the first and the second detectors for adjusting a dimmer intensity output signal to decrease the intensity of a light source when the first detector is activated, and to increase the intensity of the light source when the second detector is activated.

In a second alternative embodiment the dimmer switch assembly includes a dimmer adjusting element mounted on the housing so that a movable portion moves in first and second directions. First and second detectors are spaced from one another within the housing. A triggering device has a first end coupled to the movable portion of the dimmer adjusting element and a second end. The triggering device further includes a butterfly-shaped member pivotally coupled to the housing. The second end of the triggering device is movable with the movable portion of the dimmer adjusting element in the first direction for engaging and pivoting a first wing of the butterfly-shaped member toward to thereupon activate the first detector, and the second end of the triggering device is movable with the movable portion of the dimmer adjusting element in the second direction for engaging and pivoting a second wing of the butterfly-shaped member toward to thereupon activate the second detector. A dimmer control circuit has as inputs the signals from the first and the second detectors for adjusting a dimmer intensity output signal to decrease the intensity of a light source when the first detector is activated, and to increase the intensity of the light source when the second detector is activated.

Preferably the control circuit includes a controller that employs pulse width modulation to adjust electrical power supplied to the load. The controller is also preferably programmable to select minimum, maximum and rate of change settings of the duty cycle of the pulse width modulation signal. The control circuit preferably also includes a temperature sensor to lower the electrical power to the load should the surrounding temperature reach a maximum threshold.

An advantage of the present invention when powering an illuminating device is that inadvertent bumping of the dimmer switch assembly will not change the switch intensity to one extreme or the other, but will only change the intensity a small discrete amount.

Another advantage of the present invention is that the programmable controller using pulse width modulation provides flexible and precise adjustments to be made to the light intensity of the load through the dimmer switch assembly.

Another advantage of the present invention is that the temperature sensor will lower the electrical load to a predetermined value when the surrounding temperature reaches a threshold value in order to prevent damage to the dimmer switch assembly and other adjacent components. This feature is particularly useful when the dimmer switch is set up to operate an illuminating device in a vehicle dashboard because the addition of after market accessories can increase the load beyond the design intent.

These and other advantages of the present invention will become more apparent in the light of the following detailed description and accompanying figures.

DETAILED DESCRIPTION OF THE PREFERRED EMBODIMENTS

Figure 1:
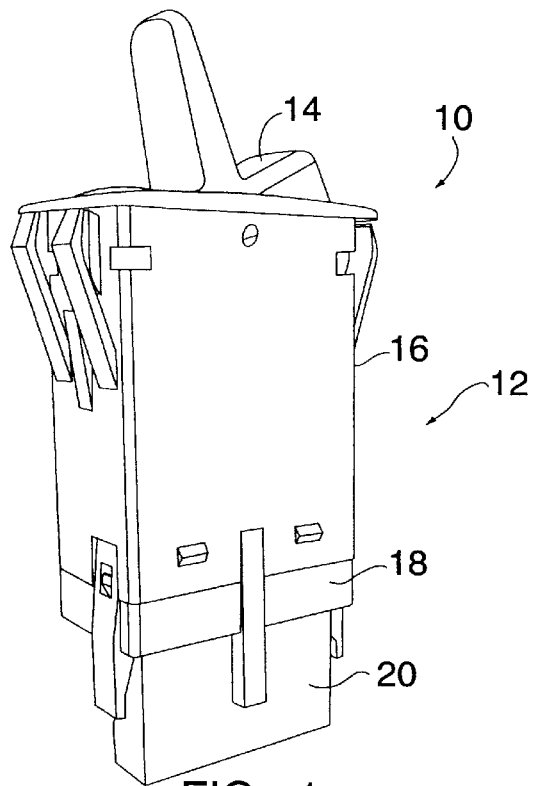
FIG. 1 is a first perspective view of the dimmer switch assembly housing.
Figure 2:
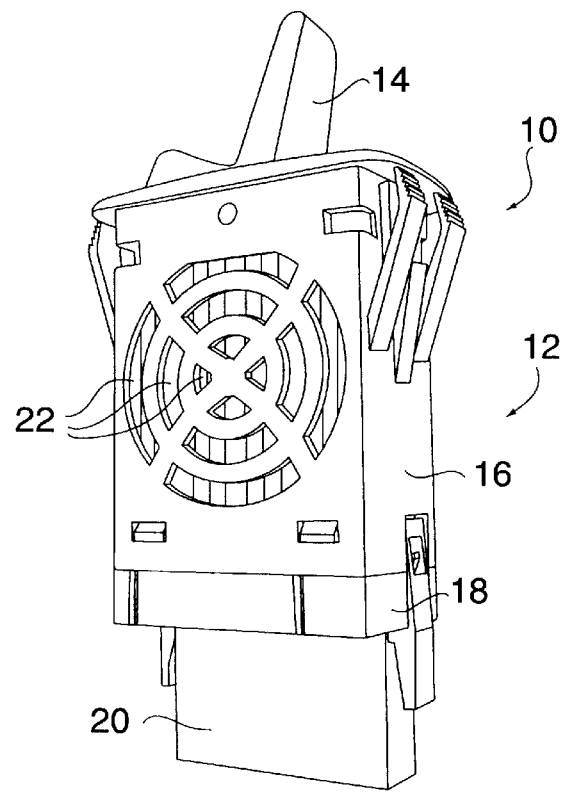
FIG. 2 is a second perspective view of the dimmer switch assembly housing.
Figure 3:
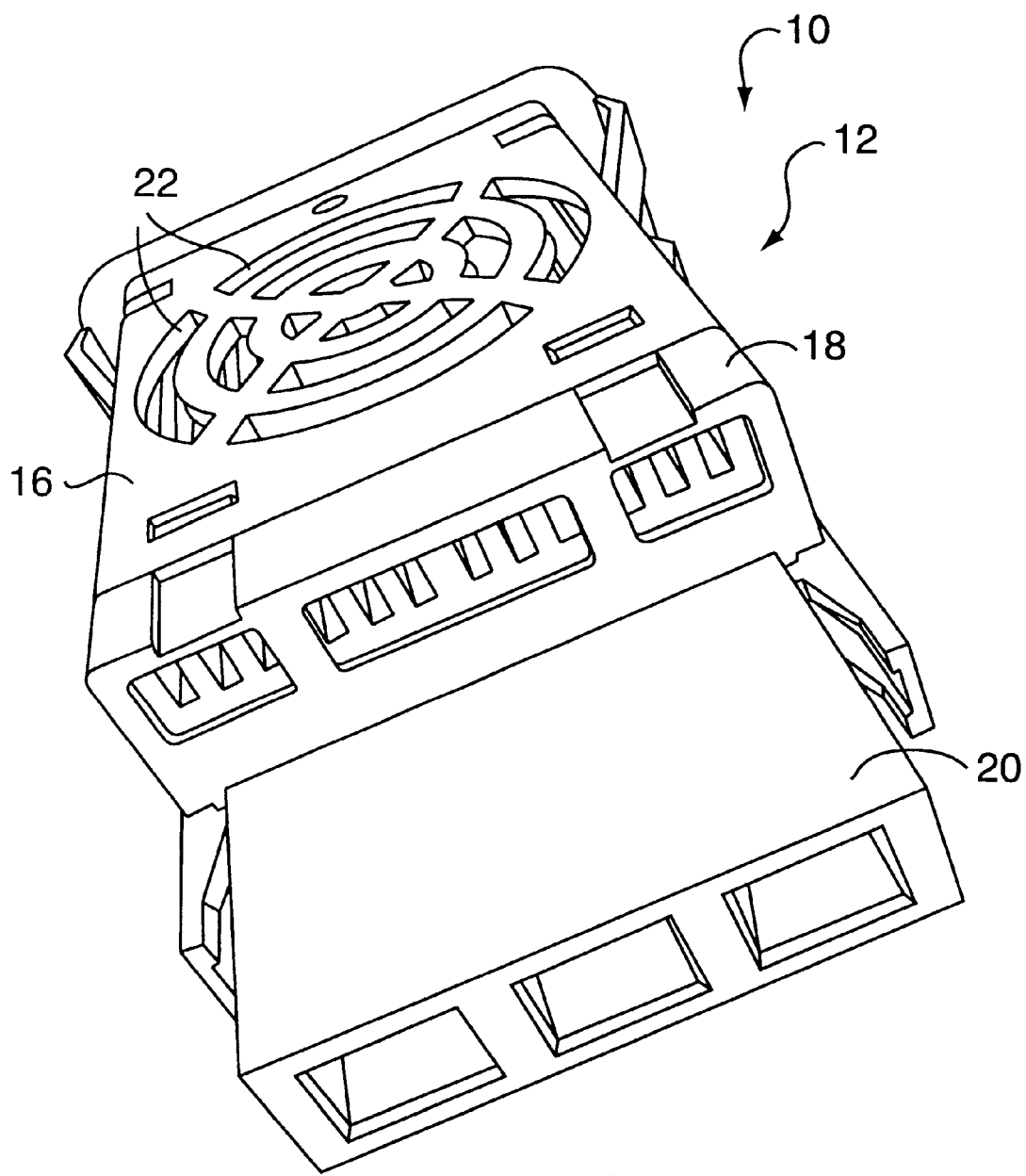
FIG. 3 is a third perspective view of the dimmer switch assembly housing.

Referring to FIGS. 1–3, a dimmer switch assembly in accordance with the present invention is designated generally by the reference number 10. The dimmer switch assembly 10 may be used in applications that require reliable incremental and decremental adjustment of electrical power supplied to a load. For example, the dimmer switch assembly 10 may be disposed on or near a dashboard of a vehicle to incrementally adjust the intensity of light illuminating the dashboard. Although the dimmer switch assembly will be explained in connection with the adjustment of light intensity of an illuminating device, it will be understood that the dimmer switch assembly may be used with the incremental and decremental adjustment of electrical power to other types of loads without departing from the broader aspects of the present invention.

The dimmer switch assembly 10 includes a generally rectangular housing 12, and a dimmer adjusting or rocker element 14 pivotably mounted about a pivot axis on a top end of the housing for incrementally and decrementally adjusting electrical power to a load such as the illuminating device of a vehicle dashboard. The housing 12 includes a body portion 16 for accommodating a control circuit (see FIG. 4), a base 18 for mounting the housing 12, and a connector portion including an electrical connector strip at a bottom end of the housing for interfacing the dimmer switch assembly 10 with a source of electrical power such as the battery of a vehicle. As shown in FIG. 2, the body portion 16 of the housing 12 defines vent openings 22 for dissipating heat generated by the control circuit.

Figure 4:
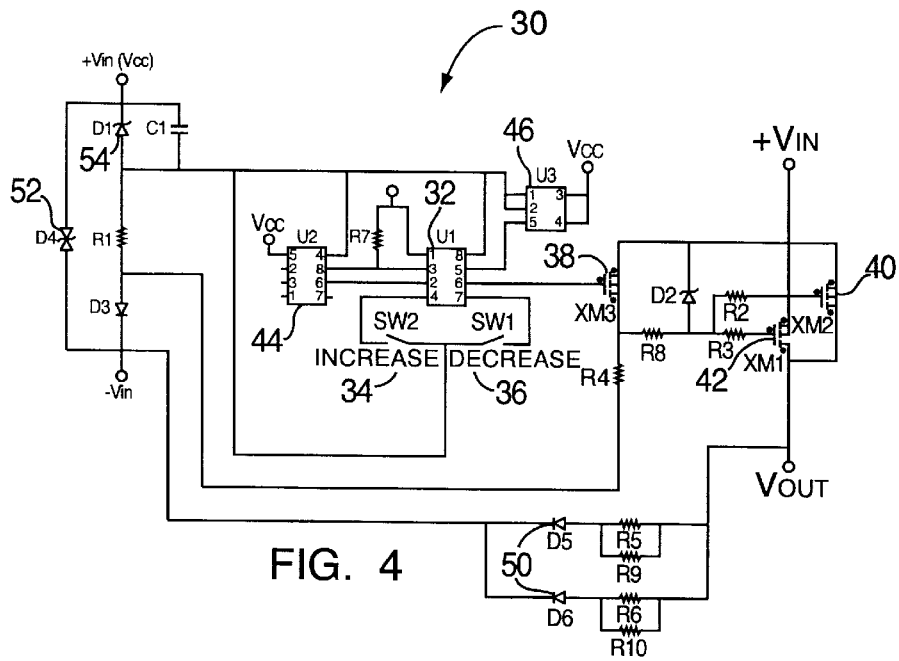
FIG. 4 schematically illustrates a dimmer control circuit as part of the dimmer switch assembly.

FIG. 4 schematically illustrates an embodiment of a control circuit 30 disposed within a housing of the dimmer switch assembly 10 for variably changing electrical power to a load coupled to a terminal Vout. The control circuit 30 includes a controller 32, for example, a Microchip PIC12C508A eight bit microcontroller, that adjusts the duty cycle of the output voltage at the terminal Vout, and consequently changes the electrical power to a load by varying the duty cycle of a pulse width modulation signal generated by the controller. First and second switches 34, 36, preferably microswitches or tactile switches, coupled to inputs of the controller 32 are temporarily closed to respectively inform the controller 32 to increment and decrement the output voltage supplied to the load by varying the duty cycle of the pulse width modulation signal generated by the controller. The controller 32 may be programmed either to switch the output voltage between a fully on state and a fully off state, or more preferably to step up or step down the output voltage in small increments as will be assumed and explained hereinbelow. The step value and rate of change of the duty cycle is programmable. The amount the duty cycle of the output voltage is adjusted is a function of the length of time the switches 34, 36 are maintained closed. The pulse width modulation signal is supplied from the controller 32 to the terminal Vout via drive transistor 38 and current carrying transistors 40, 42. Further, the controller 32 permits programming of at least a low threshold value, an upper threshold value, and the duty cycle rate of change of the pulse width modulation signal generated by the controller 32.

The control circuit includes electronic memory chip 44, such as Microchip 24C00, 16×8 CMOS serial EEPROM. The memory chip 44 provides storage for a power down duty cycle. A temperature sensor 46, such as a Maxim MAX6501UKP105 temperature switch, informs the controller 32 to decrease the duty cycle of the pulse width modulation to a predetermined level, such as 30%, when the temperature near a heatsink (see FIG. 9) reaches a predetermined level. Preferably 10% hysteresis is included in the operation of the temperature sensor 46 to avoid oscillation to and from output limited mode. The lowering of the duty cycle reduces electrical power in the switching elements that drive the load, and thereby prevents overheating and damage to the dimmer switch assembly and surrounding components. The temperature sensor 46 is particularly useful when the load is an illuminating device for a vehicle dashboard because although the switch assembly 10 is designed for a particular load level, the addition of after market accessories can increase the load beyond the design intent.

Figure 5:
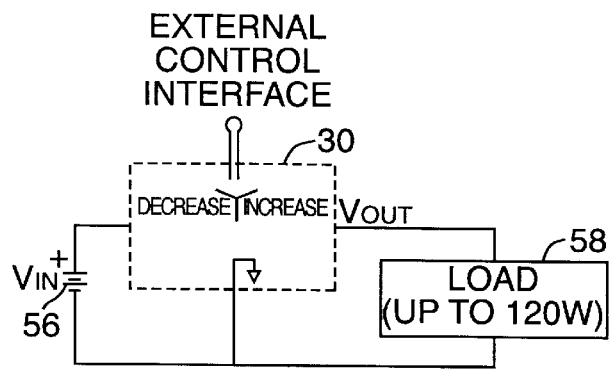
FIG. 5 schematically illustrates external connections to the dimmer control circuit of FIG. 4.

LEDS 50, 50 or other miniature illuminating devices optionally may be provided to illumine the dimmer switch assembly 10 so that a user can more easily find the dimmer switch assembly in a dark environment. Preferably, an overvoltage and surge protector including a transient voltage suppressor (TVS) 52 and zener diode 54 regulate the electrical power supplied to the control circuit 30 from input terminals +Vin and −Vin to protect the electronic circuitry from high input voltage including voltage spikes and other transient voltage anomalies. FIG. 5 illustrates in highly schematic form the control circuit 30 coupled at its input terminals to a source of electrical power such as a battery 56, and coupled at its output terminal to a load 58, such as an illuminating device for a vehicle dashboard. Preferably, the power source 56, the control circuit 30 and the load 58 are all electrically grounded for the safety of the user.

The operation of the controller 32 employing pulse width modulation may be better understood by way of example for powering an illuminating device of a vehicle dashboard. A fixed frequency pulse train of, for example, 200 Hz may be programmably generated by the controller 32. The duty cycle of this pulse train may be adjusted to change the average voltage output which, in turn, adjusts the electrical power to the load. Preferably, the frequency of the pulse train is selected to be as low as possible without resulting in noticeable flicker of the illuminating device. The controller 32 generates a time base of, for example, 5 ms, or for the particular device chosen, 500 instruction cycles. A loop counter within the controller 32 monitors the number of instruction cycles executed, and when 500 instruction cycles are executed, the controller 32 turns on the drive transistor 38. The controller 32 then determines for the execution of each instruction cycle whether a preprogrammed on-time has been reached. When the on-time for the drive transistor 38 has been reached, the controller 32 turns off the drive transistor and maintains the drive transistor in an off state until the loop counter expires (i.e., for the remainder of the duty cycle). Thus, the controller 32 turns on and off the drive transistor 38 for predetermined portions of a period to generate the duty cycle. Concurrently the controller 32 monitors control inputs to determine whether it has received a request to increase or decrease the duty cycle. A predetermined amount of debounce time, such as 16 ms, is software programmed into the controller 32 to allow for the microswitch contacts to settle. The duty cycle may be changed in the appropriate direction if it does not violate preset minimum and maximum settings. The rate at which the duty cycle changes as well as the maximum and minimum duty cycles are all software programmable.

Figure 7:
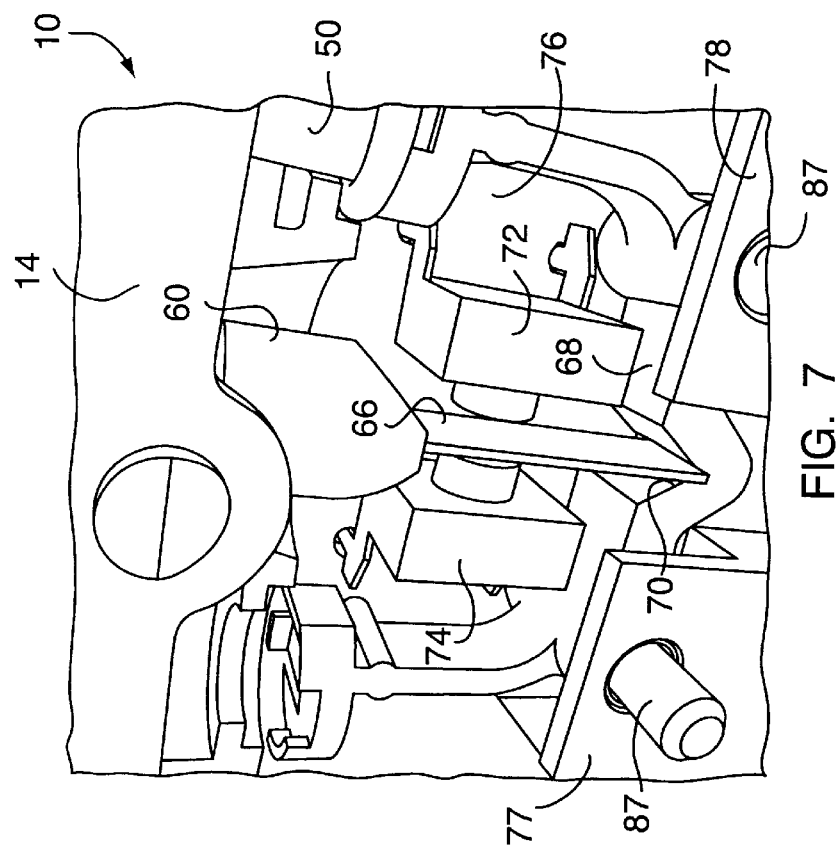
FIG. 7 is an enlarged perspective view of a portion within the dimmer switch assembly of FIG. 6.
Figure 6:
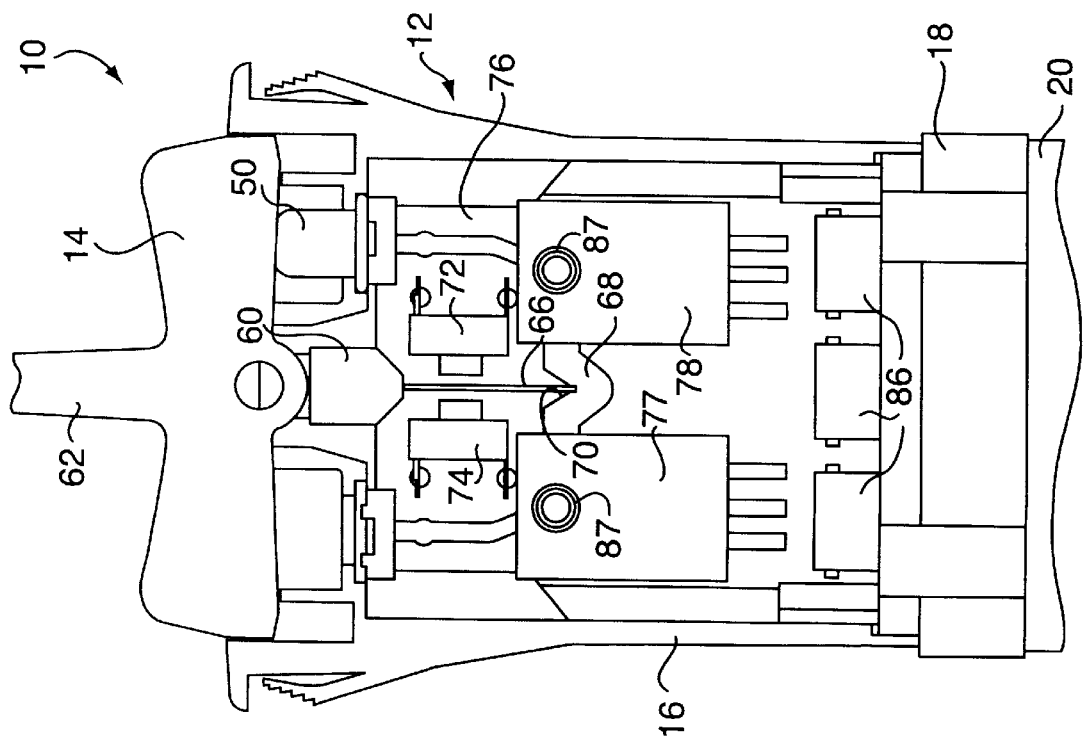
FIG. 6 is a cross-sectional, elevational view of a dimmer switch assembly in accordance with a first embodiment of the present invention.

FIGS. 6 and 7 best show the components of the dimmer switch assembly 10 disposed on and within the housing 12 in accordance with a first embodiment of the present invention. The housing 12 at an upper portion of its body portion 16 supports the dimmer adjusting or rocker element 14 which includes a movable portion or extension 60 (see FIG. 9) coupled to the body of the dimmer adjusting element. The dimmer adjusting element 14 includes a handle 62 for permitting the user to move or toggle the dimmer adjusting element in a first direction. Moving the dimmer adjusting element in the first direction decrements the duty cycle of the pulse width modulation signal generated by the control circuit 30 to thereby decrease electrical power supplied to the load. Similarly, the dimmer adjusting element 14 may be moved or toggled in a second direction opposite to that of the first direction for incrementing the duty cycle of the pulse width modulation signal to thereby increase electrical power to the load.

Figure 8:
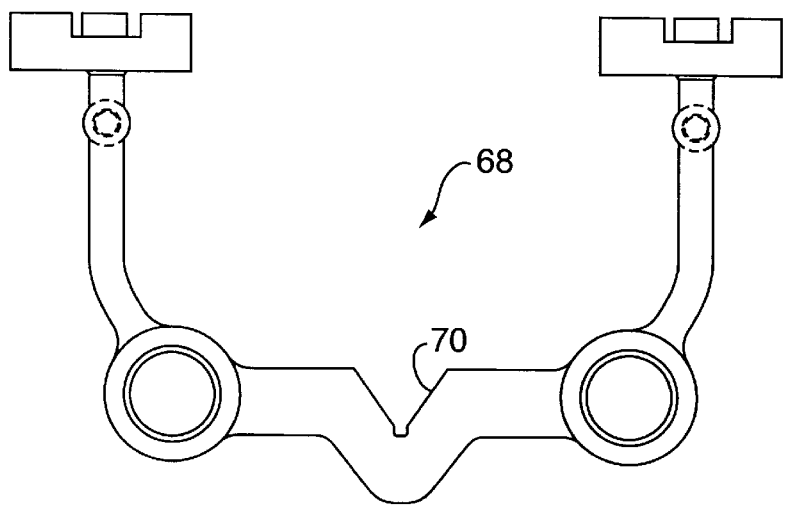
FIG. 8 is a side elevational view of the yoke portion of the dimmer switch assembly of FIG. 6.

As shown in FIGS. 6 and 7, the dimmer adjusting element 14 includes a triggering device 64 in the form of an elongated flexible member 66, such as a steel leaf spring, having a first longitudinal end coupled to the movable portion 60 of the dimmer adjusting element, and a second longitudinal end provided in a socket 68 supported on the housing 12. As best shown in FIG. 8, the socket 68 is preferably in the form of a yoke having a curved central portion 70 for providing a fulcrum for securing the second end of the elongated flexible member 66.

Referring again to FIGS. 6 and 7, first and second microswitches or tactile switches 72, 74 are spaced from one another in opposing relationship on a circuit board 76 accommodated within the body portion 16 of the housing 12 such that the flexible member 66 is interposed between the microswitches. The first and second microswitches 72, 74 each generally function as a detector for sensing the bending of the flexible member 66 toward the detector as will be explained more fully hereinbelow. The dimmer switch assembly 10 further includes first and second switching transistors 77, 78, such as P-channel power MOSFETs. The transistors are in parallel to better accommodate the circuitry of the controller 32 (see FIG. 4). At least one LED 50 may be provided to illumine the dimmer switch assembly 10 so that the assembly may be more easily located by the user in a dark environment.

In operation, when the dimmer adjusting element 14 is pivoted in a first direction, such as a counterclockwise direction, the movable portion 60 of the dimmer adjusting element moves generally in a rightward direction causing the first end of the flexible member coupled to the movable member to move therewith. As the first end of the elongated member 66 moves rightwardly relative to its stationary second end fixed in the yoke 68, the center portion of the elongated member bends or flexes slightly in the rightward direction to engage and thereby close the first microswitch 72. The first microswitch 72 when closed informs the controller 32 to decrement the duty cycle of the pulse width modulation signal generated by the controller an amount that is a function of the length of time the dimmer adjusting element 14 maintains the first microswitch in a closed state.

Similarly, when the dimmer adjusting element 14 is pivoted in a second direction generally opposite to that of the first direction, such as a clockwise direction, the movable portion 60 of the dimmer adjusting element moves generally in a leftward direction causing the first end of the flexible member 66 coupled to the dimmer adjusting element to move therewith. As the first end of the elongated member 66 moves leftwardly relative to its stationary second end fixed in the yoke 68, the center portion of the elongated member bends or flexes slightly in the leftward direction to engage and thereby close the second microswitch 74. The second microswitch 74 when closed informs the controller 32 to increment the duty cycle of the pulse width modulation signal generated by the controller an amount which is a function of the length of time the dimmer adjusting element 14 maintains the second microswitch in a closed state.

Figure 9:
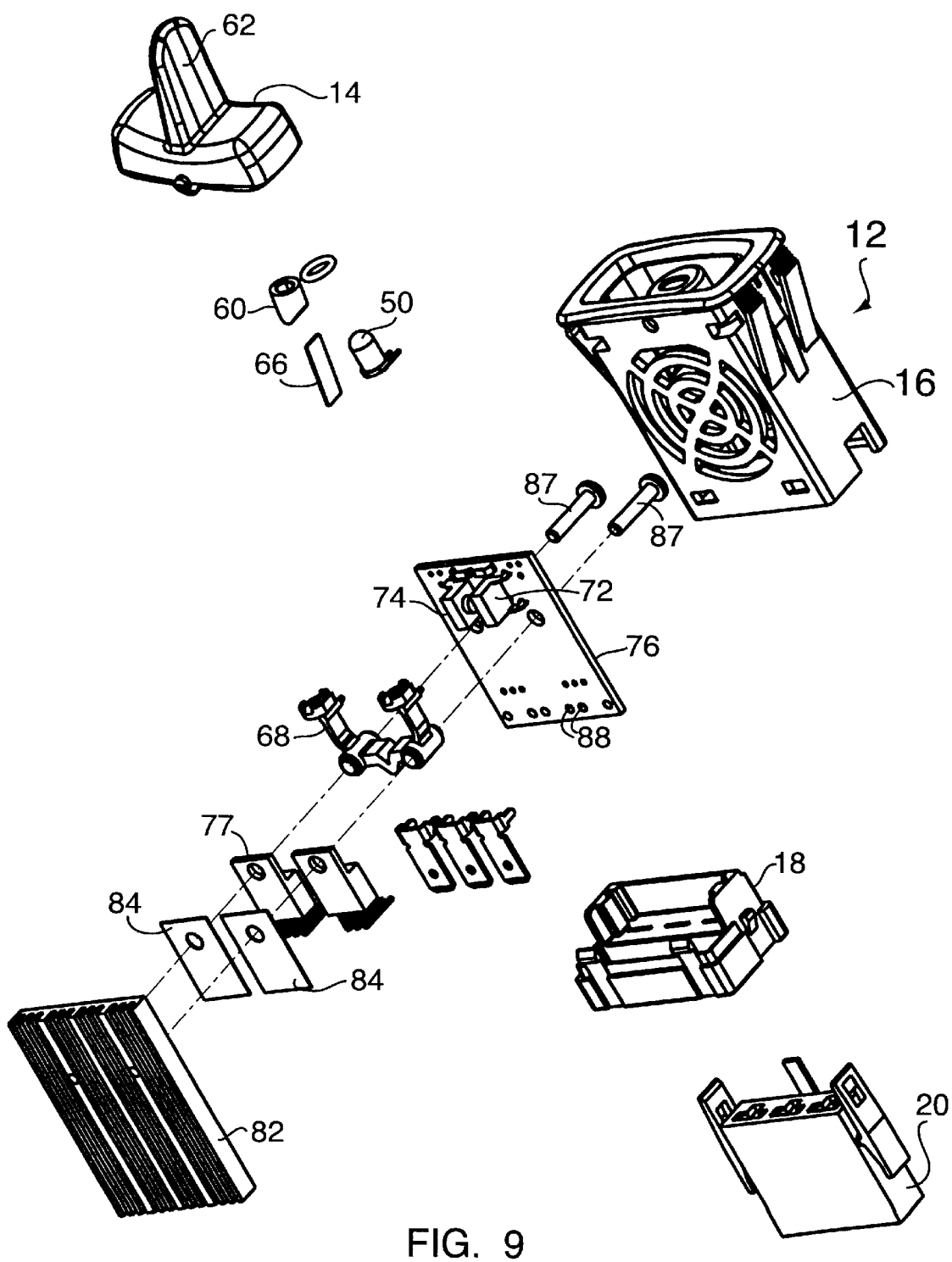
FIG. 9 is a disassembled, exploded view of the dimmer switch assembly of FIG. 6.

FIG. 9 is an exploded view illustrating some of the components that may comprise the dimmer switch assembly previously described with reference to FIGS. 1–8. As was previously mentioned with respect to FIGS. 1–3, the housing 12 generally comprises three parts, the main portion 16 for accommodating the control circuit 30 (see FIG. 4), the base 18 for mounting the dimmer switch assembly 10, and a connector portion 20 attachable to the base for interfacing the dimmer switch assembly with a source of electrical power such as a vehicle battery. The assembly 10 preferably includes a heatsink 82 disposed within the main portion 16 of the housing 12 adjacent to the vent openings 22, and insulation pads 84, 84 interposed between the switching transistors 77, 78, and the heatsink 82 to protect the transistors from overheating. As can be seen in FIG. 9, the yoke 68, the switching transistors 77, 78, the insulation pads 84 and the heatsink 82 are mounted in fixed relation to the circuit board 76 via screws 87, 87. Power supply terminals 86, 86 of the control circuit 30 each have a first end coupled to corresponding holes 88, 88 defined in the circuit board 76, and each have second ends extending through corresponding holes defined in the base 18 so as to be received into the connector portion 20 of the housing 12 so that electrical power may be supplied from a power source to the circuit board 76.

Figure 10:
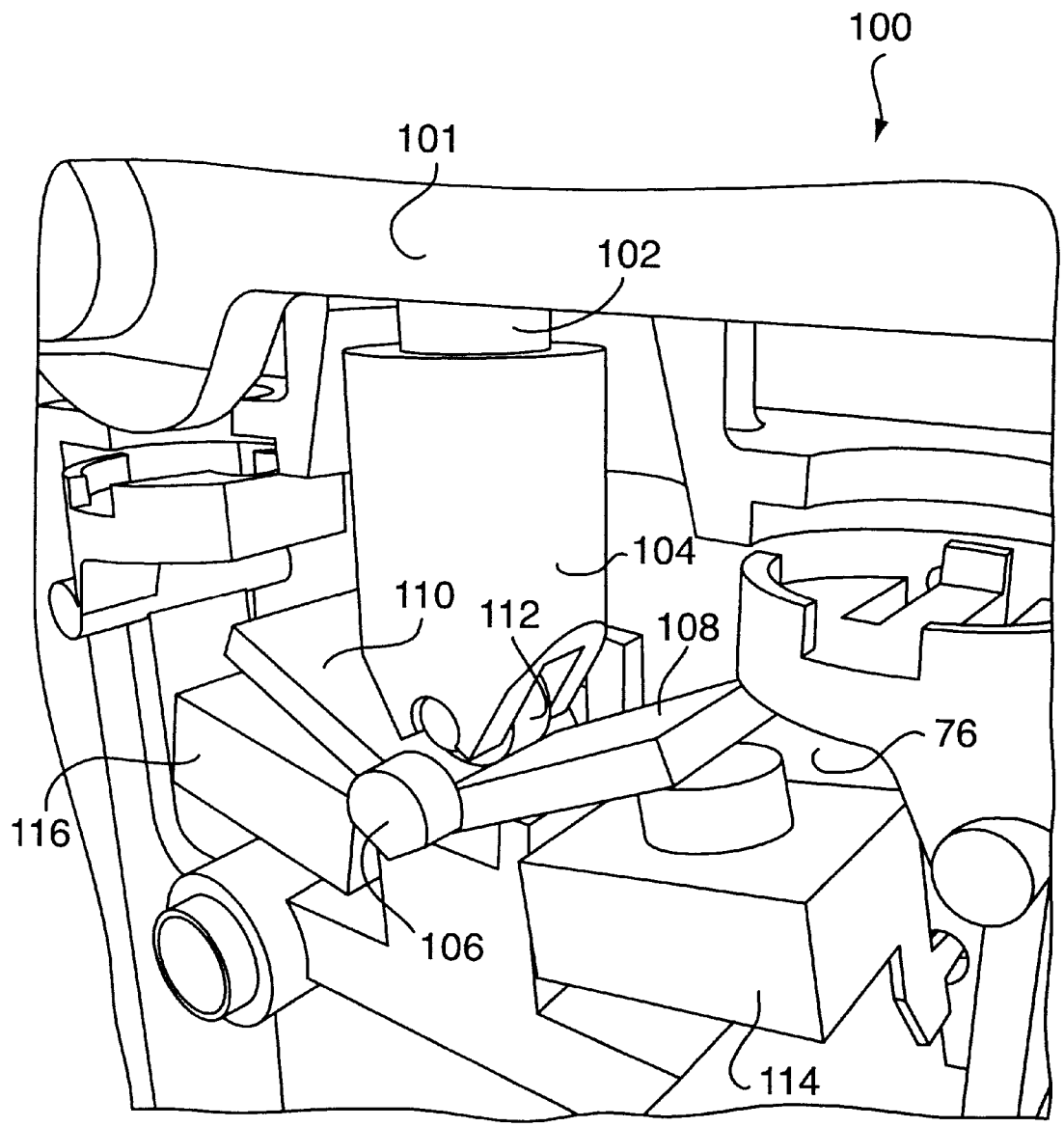
FIG. 10 is a perspective view within a dimmer switch assembly in accordance with a second embodiment of the present invention.

FIG. 10 illustrates a portion of a dimmer switch assembly 100 in accordance with a second embodiment of the present invention. A difference between the dimmer switch assembly 10 of the previous embodiment and the dimmer switch assembly 100 is the components for closing the microswitches 72, 74. The body portion 16 of the housing 12 on an upper portion supports the dimmer adjusting or rocker element 101 including a movable portion or extension 102. The dimmer adjusting element 101 is moved or toggled by a user in a first direction to decrement the duty cycle of the pulse width modulation signal to thereby decrease electrical power supplied by the control circuit to the load. Similarly, the dimmer adjusting element 101 may be moved or toggled in a second direction opposite to that of the first direction for incrementing the duty cycle of the pulse width modulation signal to thereby increase electrical power to the load.

As shown in FIG. 10, a triggering device includes an elongated member 104 and a butterfly-shaped member 106 having first and second wings 108, 110 pivotably mounted on the circuit board 76. The elongated member 104 is coupled at a first end to the movable portion 102 of the dimmer adjusting element 101, and the elongated member preferably includes a roller element 112 at its second end for slidably engaging and pivoting the butterfly-shaped member 106. First and second microswitches or tactile switches 114,116 are respectively disposed in spaced relation to the first and second wings 108, 110 of the butterfly-shaped member 106 when the butterfly member is in a neutral position.

In operation, when the dimmer adjusting element 101 is pivoted in a first direction, such as a counterclockwise direction, the roller element 112 of the elongated member 104 slidably engages the first wing 108 of the butterfly-shaped member 106 to pivot the first wing toward to engage and thereby close the first microswitch 114. The first microswitch 114 when closed informs the controller 32 (see FIG. 4) to decrement the duty cycle of the pulse width modulation signal generated by the controller an amount which is a function of the length of time the dimmer adjusting element 101 maintains the first microswitch in a closed state.

Similarly, when the dimmer adjusting element 101 is pivoted in a second direction generally opposite to that of the first direction, such as a clockwise direction, the roller element 112 of the elongated member 104 slidably engages the second wing 110 of the butterfly-shaped member 106 to pivot the second wing toward to engage and thereby close the second microswitch 116. The second microswitch 116 when closed informs the controller 32 to increment the duty cycle of the pulse width modulation signal generated by the controller an amount which is a function of the length of time the dimmer adjusting element 101 maintains the second microswitch in a closed state.

The dimmer switch assembly described by way of preferred embodiments thus provides a precise and flexible way to adjust the light intensity of the load through the dimmer switch assembly. The assembly further provides protection against overheating to avoid damage to the dimmer switch assembly and surrounding components.

Although the invention has been shown and described in preferred embodiments, it should be understood that numerous modifications can be made without departing from the spirit and scope of the present invention. Accordingly, the present invention has been shown and described by way of illustration rather than limitation.

What is claimed is:

1. A dimmer switch assembly comprising:
   a housing;
   a dimmer adjusting element mounted on the housing and having a movable portion for movement in first and second directions inside the housing;
   a triggering device coupled to the movable portion of the dimmer adjusting element;
   first and second detectors spaced from one another, the triggering device being interposed between the detectors such that movement of the triggering device in the first direction activates the first detector when the dimmer adjusting element is moved in the first direction, and movement of the triggering device in the second direction activates the second detector when the dimmer adjusting element is moved in the second direction, the detectors having signals associated respectively therewith; and
   a dimmer control circuit having as inputs the signals from the first and the second detectors for decreasing an output signal when the first detector is activated, and to increase the output signal when the second detector is activated.

2. A dimmer switch assembly as defined in claim 1, wherein the triggering device is an elongated flexible member having a first longitudinal end coupled to the movable portion of the dimmer adjusting element and a second longitudinal end provided in a socket defined by the housing, and wherein the first and second detectors are arranged opposite one another, the elongated member being interposed between the detectors such that movement of the dimmer adjusting element in the first direction flexes the elongated member toward to activate the first detector, and movement of the dimmer adjusting element in the second direction flexes the elongated member toward to activate the second detector.

3. A dimmer switch assembly as defined in claim 1, wherein the triggering device has a first end coupled to the movable portion of the dimmer adjusting element and a second end, and the triggering device further includes a butterfly-shaped member pivotally coupled to the housing, the second end of the triggering device being movable with the movable portion of the dimmer adjusting element in the first direction for engaging and pivoting a first wing of the butterfly-shaped member toward to thereupon activate the first detector, and the second end of the triggering device being movable with the movable portion of the dimmer adjusting element in the second direction for engaging and pivoting a second wing of the butterfly-shaped member toward to thereupon activate the second detector.

4. A dimmer switch assembly as defined in claim 1, wherein the dimmer control circuit includes programmable means for adjusting the dimmer intensity output signal to turn the light source to a fully-off state when the first detector is activated, and to turn the light source to a fully-on state when the second detector is activated.

5. A dimmer switch assembly as defined in claim 1, wherein the dimmer control circuit includes programmable means for adjusting the dimmer intensity output signal to decrement the intensity of the light source a predetermined amount for each activation of the first detector, to increment the intensity of the light source a predetermined amount for each activation of the second detector, and to maintain the dimmer intensity output signal between predetermined minimum and maximum values.

6. A dimmer switch assembly as defined in claim 1, wherein the first and the second detectors are on/off tactile switches.

7. A dimmer switch assembly as defined in claim 1, wherein the dimmer adjusting element is pivotably mounted on the housing and movable about a pivot axis in the first and second directions about the pivot axis, the movable portion being coupled to the triggering device.

8. A dimmer switch assembly as defined in claim 2, further including a yoke fixed to the housing, the yoke including a curved central portion serving as a fulcrum for securing the second end of the elongated flexible member.

9. A dimmer switch assembly as defined in claim 1 wherein the dimmer control circuit includes a pulse width modulation (PWM) controller which varies a duty cycle of the PWM for changing a voltage level of the dimmer intensity output signal to adjust the intensity of the light source.

10. A dimmer switch assembly as defined in claim 1, wherein the dimmer control circuit includes an 8-bit microcontroller.

11. A dimmer switch assembly as defined in claim 1, wherein the dimmer control circuit includes a temperature switch for signaling the control circuit to adjust the dimmer intensity output signal to decrease the intensity of the light source when the temperature adjacent to the control circuit is above a predetermined threshold.

12. A dimmer switch assembly as defined in claim 11, wherein the temperature switch is a MAX 6501 temperature switch.

13. A dimmer switch assembly as defined in claim 1, further including an EEPROM device coupled to the dimmer control circuit for providing programming instructions to the control circuit.

14. A dimmer switch assembly as defined in claim 13, wherein the EEPROM device is a 16×8 bit EEPROM.

15. A dimmer switch assembly comprising:

a housing;

a dimmer adjusting element mounted on the housing and having a movable portion for movement in first and second directions;

an elongated flexible triggering member having a first longitudinal end coupled to the movable portion of the dimmer adjusting element and a second longitudinal end provided in a socket defined by the housing;

first and second detectors spaced from and arranged opposite to one another, the elongated member being interposed between the detectors such that movement of the dimmer adjusting element in the first direction flexes the elongated member toward to activate the first detector, and movement of the dimmer adjusting element in the second direction flexes the elongated member toward to activate the second detector, the detectors having signals associated respectively therewith; and a dimmer control circuit having as inputs the signals from the first and the second detectors for adjusting a dimmer intensity output signal to decrease the intensity of a light source when the first detector is activated, and to increase the intensity of the light source when the second detector is activated.

16. A dimmer switch assembly comprising:

a housing;

a dimmer adjusting element mounted on the housing and having a movable portion for movement in first and second directions;

first and second detectors spaced from one another;

a triggering device having a first end coupled to the movable portion of the dimmer adjusting element and a second end, the triggering device further including a butterfly-shaped member pivotally coupled to the housing, the second end of the triggering device being movable with the movable portion of the dimmer adjusting element in the first direction for engaging and pivoting a first wing of the butterfly-shaped member toward to thereupon activate the first detector, and the second end of the triggering device being movable with the movable portion of the dimmer adjusting element in the second direction for engaging and pivoting a second wing of the butterfly-shaped member toward to thereupon activate the second detector; and a dimmer control circuit having as inputs the signals from the first and the second detectors for adjusting a dimmer intensity output signal to decrease the intensity of a light source when the first detector is activated, and to increase the intensity of the light source when the second detector is activated.

* * * * *